UNITED STATES PATENT OFFICE.

CARL THEODOR THORSSELL AND HARALD LUDVIG REINHOLD LUNDÉN, OF GOTTENBORG, SWEDEN.

PROCESS FOR THE PRODUCTION OF OXALIC ACID.

1,251,938. Specification of Letters Patent. Patented Jan. 1, 1918.

No Drawing. Application filed August 13, 1915. Serial No. 45,411.

*To all whom it may concern:*

Be it known that we, CARL THEODOR THORSSELL and HARALD LUDVIG REINHOLD LUNDÉN, residing at Gottenborg, in State of Sweden, have invented certain new and useful Improvements in Processes for the Production of Oxalic Acid, of which the following is a specification.

Our invention relates to a process for the production of oxalic acid from oxalate of sodium, which is mixed with carbonate of sodium and a little caustic soda (sodium hydrate).

Oxalic acid and sulfate of sodium are obtained from the oxalate of sodium when sulfuric acid is added to the mixture of the three first-mentioned salts, and the sodium carbonate and the caustic soda are also transformed into sulfate of sodium. But this cannot be carried out conveniently in one operation, as acid oxalate of sodium precipitates and to get this transformed into oxalic acid so great a surplus of sulfuric acid would be needed that all the sodium would be present in the form of acid sulfate and there would still be a surplus of free sulfuric acid.

By dividing the reaction in two parts or stages of treatment it can, however, be carried out with the desired result. Thus in the first stage the oxalate of sodium is transformed into acid oxalate of sodium and neutral sodium sulfate, and the sodium carbonate and the caustic soda are also converted into neutral sodium sulfate by means of a solution containing acid sulfate of sodium and sulfuric acid, which solution may be conveniently obtained from the second stage of treatment, thus making the process a continuous one.

In the second stage the obtained acid oxalate of sodium is treated with sulfuric acid, whereupon oxalic acid and a solution of acid sulfate of sodium are obtained together with sulfuric acid, which may be used in the first stage of the repeated operation for the solution of the oxalate. Thus, in the first stage a solution obtainable from a previous stage and a solid substance (from the oxalate furnaces) are used, and a solution (neutral sulfate, forming the finished article) and a solid substance for subsequent use in the second stage are obtained. At the second stage a liquid (sulfuric acid) and a solid substance from the first stage are used, and a solution, for subsequent use in the first stage, and a solid substance (oxalic acid=end product) are obtained.

The finished oxalic acid must be washed with water and recrystallized so that it becomes perfectly pure, and besides it is advantageous to wash the acid oxalate a little, before it goes to the second stage. These washing liquids may be utilized without evaporation. The sulfate of sodium as well as the oxalic acid crystallize with water, and therefore a great quantity of water must be utilized in the operation. It is true that a little water is brought in with the sulfuric acid and that smaller quantities are formed when the carbonate of sodium and the caustic soda are converted into sulfate, but still the greater part must be added in the form of washing liquids. The method of working is thus made a little more complicated as is shown by the following description. For convenience, the various washing liquids, solutions, etc., herein referred to, will be designated by the letters of the alphabet.

The substance coming from the oxalate furnaces and consisting of oxalate of sodium, carbonate of sodium and caustic soda is washed in liquid $b$ ($Na_2SO_4 + H_2SO_4 + NaHC_2O_4 + H_2O$) obtained by washing of the acid oxalate at a previously performed operation and in the mother-liquor $a$ ($Na_2SO_4 + H_2O$) obtained from the crystallizing of the sodium sulfate at a previously performed operation. If sulfate free from water of crystallization is to be produced and the solution of sodium sulfate is to be evaporated, pure water should be used for the washing instead of the mother-liquor $a$. A solution $c$ obtained from the second stage of the process, containing $NaHSO_4 + H_2SO_4 + H_2C_2O_4 + H_2O$ is also added. The quantity of this solution is calculated so that the sodium oxalate is converted into acid oxalate and into neutral sodium sulfate, and the sodium carbonate and sodium hydrate are also transformed into neutral sulfate. A certain trifling surplus of acid ought to be present, as otherwise it is difficult to perform the reaction completely. The operation will also be accelerated by stirring and heating. The quantity of water in the solution is calculated so that all the sulfate is dissolved when the solution is heated. The acid oxalate obtained is separated in the form of fine crystals except a small part which remains dissolved. For the purpose of lessening this dissolved part the solution is cooled to about 35° C.

The acid oxalate is filtered off and washed with water whereupon it passes to the second stage. The washing liquid $b$ containing mainly sodium sulfate and small quantities of free sulfuric acid and acid oxalate is utilized for the washing of the sodium oxalate at the next operation (the first operation of the first stage).

The filtrate $d$ contains chiefly sodium sulfate with a little free sulfuric acid and acid oxalate. Out of this sulfate of sodium may be secured either with water of crystallization or free therefrom. In the first case the solution must be purified, as otherwise the finished article will contain impurities from the acid oxalate. For this purpose lime and sodium carbonate are added in calculated quantities to filtrate $d$, so that the oxalic acid precipitates as oxalate of calcium and the solution becomes as slightly alkaline as possible. The oxalate of calcium precipitated is filtered off, washed and then it can be decomposed in oxalic acid and sulfate of calcium by means of sulfuric acid after a sufficient quantity has been collected. The washing liquid is used at the next operation for dissolving the sodium carbonate and lime. The pure solution of sulfate of sodium filtered off is cooled, whereby the sulfate crystallizes with water. The crystals forming the finished article are separated centrifugally and the mother-liquor passes back to the first operation of the first stage of the process for washing the sodium oxalate from the furnaces.

If, on the contrary, sodium sulfate free from water is to be produced the solution is evaporated without purifying, with a trifling addition of sodium carbonate, if the percentage of acid should be too great.

At a sufficiently high temperature the oxalic acid sublimates or is decomposed from the acid oxalate, and an article free from oxalate with a little free acid is obtained.

The solid acid oxalate obtained is then treated further (the second stage of the process). It is stirred in a washing liquid $f$ obtained at a previously performed operation when washing the raw oxalic acid, and then sulfuric acid is added. The mixture is simultaneously heated until a clear solution is obtained. The quantity of sulfuric acid is calculated so that no acid oxalate precipitates at the cooling, but only pure oxalic acid. The stronger the solution used the better. The solution is cooled, whereby the greater part of the oxalic acid precipitates. This is filtered off and the filtrate $c$ goes back to the first stage for washing the sodium oxalate from the furnaces. It consists of acid sulfate of sodium and free sulfuric acid and it is saturated with oxalic acid at the temperature used. The surplus of sulfuric acid which was needed for preventing acid oxalate from precipitating is needed for neutralizing the sodium carbonate and sodium hydrate. If more solution should be obtained than is needed for washing the oxalate from the furnaces, it cannot conveniently be utilized in any way. By a better cooling at the second stage its quantity may be reduced. Besides, its quantity is also dependent on the outcome in the oxalate furnaces.

The raw oxalic acid obtained is washed with a mother-liquor $g$ which has been obtained at the recrystallization of the oxalic acid in a previously performed operation. The washing liquid $f$ is used for washing the acid oxalate at the next operation. The oxalic acid thus washed is dissolved in pure water during heating and then it is again cooled. The crystallized oxalic acid is separated from the mother-liquor $g$ and constitutes the finished article. The mother-liquor $g$ is used for washing the raw oxalic acid at the next operation.

It is obvious that different and equivalent salts might be initially used, and changes made in the details of this process, without departing from the spirit of our invention.

What we claim is:—

1. In the art of making oxalic acid from a mixture of sodium oxalate, sodium carbonate, and sodium hydrate, those steps in the art which consist in treating the said mixture with a solution containing sodium acid sulfate and sulfuric acid, so that acid sodium oxalate and neutral sodium sulfate are formed, and crystallizing the acid sodium oxalate out of the solution.

2. In the art of making oxalic acid from sodium oxalate, those steps in the art which consist in transforming the said salt to acid sodium oxalate held in solution, crystallizing a portion of said acid sodium oxalate from said solution, and then neutralizing said solution and transforming the remainder of said dissolved acid sodium oxalate into an insoluble salt of oxalic acid.

In testimony whereof we have affixed our signatures in presence of two witnesses.

CARL THEODOR THORSSELL.
HARALD LUDVIG REINHOLD LUNDÉN.

Witnesses:
J. TOROLF CLAVIUS,
SVEN A. SKOLDBERG.